United States Patent Office 3,397,335
Patented Aug. 13, 1968

3,397,335
SAFETY REFLECTIVE HEADLIGHTS
Francis E. Peek, 720 E. Three Fountains Drive,
Murray, Utah 84107
Filed Oct. 3, 1966, Ser. No. 583,663
8 Claims. (Cl. 313—111)

This invention relates to a headlight for conventional vehicles such as automobiles, trucks, etc., and in particular, to a headlight with a reflective surface adapted to be illuminated by the lights of oncoming vehicles.

With the prodution of large numbers of automobiles and other traction vehicles during the last few years there has been a very substantial increase in the numbers of accidents involving collisions between oncoming vehicles, i.e., head-on collisions. These accidents often occur at night when one or both of the headlights of a vehicle are not burning. As a result, the driver of an oncoming vehicle is unable to determine the perimeter of the vehicle in his path which causes a collision of the type described. Heretofore attempts have been made to provide headlights with reflective surfaces that are illuminated by the light emitted from oncoming vehicles thereby providing a warning to the drivers of such oncoming vehicles that one or both of the headlights of the vehicle in their path are not burning. However, such reflective surfaces generally greatly diminish the intensity of the light emitted from the headlight thereby creating a hazard which is greater than the one which the user of such lights is trying to overcome. In addition, reflective surfaces heretofore used in combination with headlights generally require the use of structure that cannot be adapted to conventional headlights used in many of the recent model vehicles such as the sealed beam headlight.

Accordingly, an object of my invention is to provide a safety reflective headlight which overcomes the objections and disadvantages heretofore found in such lights.

Another object of my invention is to provide a headlight, adapted to be used in traction vehicles, with a reflective surface for warning drivers in oncoming vehicles that said headlight is not burning.

It is another object of my invention to provide a safety reflective headlight that is brightly illuminated when placed in the beam of an approaching light.

Still another object of my invention is to provide a safety reflective surface in a headlight which is illuminated by the beam of an oncoming light and yet which does not diminish the intensity of the light emitted from said headlight.

Still another object of my invention is to provide a headlight having a reflective surface positioned in the interior of said headlight.

Still another object of my invention is to provide a reflective surface adapted to be secured in the interior of a sealed beam headlight.

Still another object of my invention is to provide a safety reflective headlight which is simple in design and inexpensive to construct.

Still other objects of my invention will become apparent to those skilled in the art as the invention is better understood by reference to the detailed description appearing hereinafter.

The foregoing objects and attendant advantages may be achieved by providing a headlight having conically shaped sidewalls for directing light outwardly away from a light source which is positioned at the apex of said sidewalls. A cylindrical reflecting surface, having a hollow center area axially aligned with said light source, is connected to said sidewalls at a position so that the periphery of said reflecting surface is spaced apart from said sidewall thereby forming an annulus therebetween. The reflecting surface is coated with a material which is illuminated when contacted with a beam of light of proper intensity. In a preferred embodiment of my invention the back of said reflecting surface, i.e., the side opposite from the reflecting surface, is provided with a mirrored surface for redirecting light from said light source, which light contacts said back side, back to said converging sidewalls and outwardly therefrom. In the most preferred embodiment of my invention the reflective surface is coated with beaded reflective paint.

So that the invention may be more readily understood and carried into effect, reference is made to the accompanying drawings which are offered by way of example only and are not to be taken as limiting the invention, the scope of which is defined by the appended claims, which obviously embrace equivalent structures and processes.

Figure 1:
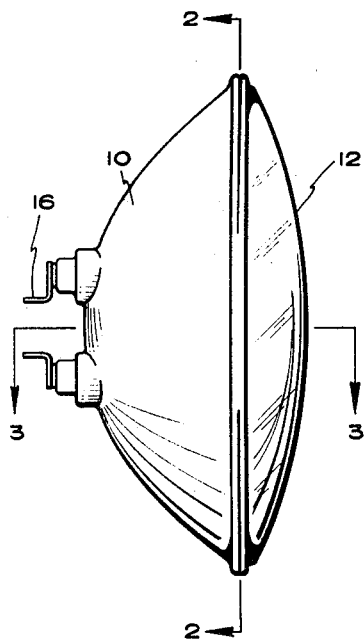
FIGURE 1 is a side view of a conventional sealed beam headlight with conically shaped sidewalls and a protective transparent front cover.
Figure 2:
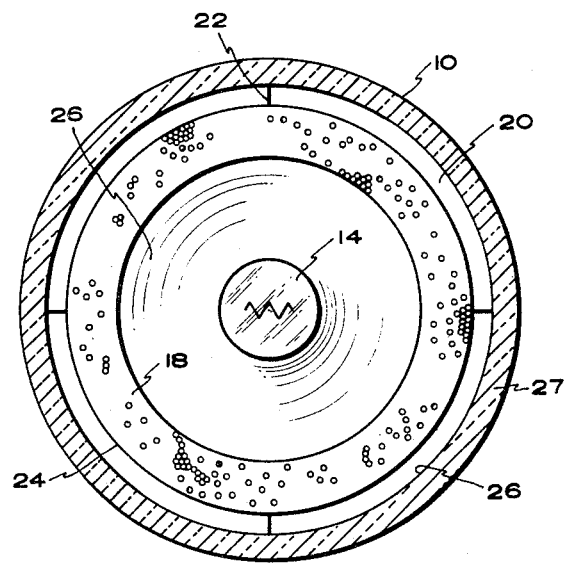
FIGURE 2 is a sectional view of FIGURE 1 taken along line 2—2 showing a plan view of the interior of a sealed beam with a reflective ring, constructed according to my invention, secured to the converging sidewalls of said sealed beam.

Referring now more particularly to the drawings, FIGURE 1 shows a side view of a conventional sealed beam headlight having outwardly flaring conical shaped sidewalls 10 with transparent shield 12 securely attached to said sidewalls 10 proximate their outermost periphery. Said shield 12 is constructed from a glass or a transparent resin such as acrylate, methacrylate, cellulose acetate, cellulose acetate butyrate, cellulose nitrate, ethyl cellulose, phenolformaldehyde compounds, polyvinyl acetate, polystyrene, etc. Lighting means, e.g., a conventional electrical bulb 14, shown in FIGURE 2, is secured to said headlights proximate the apex of conical shaped sidewalls 10 and is positioned to direct light outwardly through transparent shield 12. Electrical connectors 16 are connected to said lighting means for connecting it to a source of electrical energy, not shown in the drawings.

Figure 3:
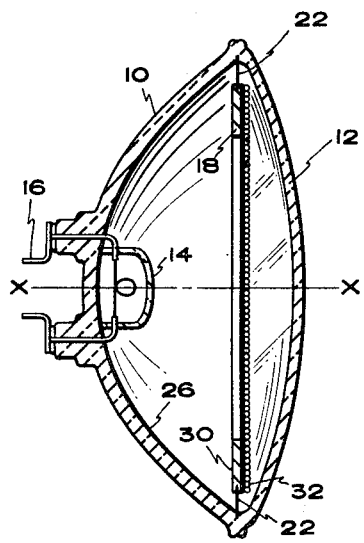
FIGURE 3 is a sectional view of FIGURE 1 taken along line 3—3 showing an enlarged side view of a sealed beam with a reflecting surface positioned therein according to my invention.

FIGURES 2 and 3 are sectional views of the headlight shown in FIGURE 1 taken along line 2—2 and along line 3—3 respectively. These figures show in detail safety reflecting ring 18 incorporated in said headlight. Said ring 18 is preferably cylindrically shaped with a hollow center portion axially aligned with the apex of sidewalls 10. Reflective ring 18 has an outside diameter which is less than the inside diameter of sidewalls 10 at a line on said sidewalls 10 taken along a plane which passes through, and which is parallel with, said ring 18 and which is substantially perpendicular to center avis $x$—$x$ of the headlight. Accordingly, an annulus 20 having a width of about $\frac{1}{16}$ to 1 inch, and preferably, $\frac{1}{8}$ to $\frac{3}{4}$ inch, is formed between said sidewalls 10 and said safety ring 18.

Reflecting ring 18 is preferably constructed from a material that is not deformed or weakened by the heat generated by light source 14. Preferably said ring 18 is constructed from a metal such as iron, steel, copper, brass, aluminum, etc. It is connected to sidewalls 10 by any conventional spacing means such as metal fingers 22 shown in FIGURE 2. Such fingers are securely attached at one end, e.g., welded, to the periphery or outer edge 24 of ring 18 and their opposite end is embedded in sidewalls 10 to securely hold ring 18 at a position spaced apart from said sidewalls as previously described. Any number of such fingers 22 may be used to attach ring 18 provided that a substantial proportion of the annular area between ring 18 and sidewalls 10 is unobstructed so that light from source 14 may pass therethrough. Accordingly, in the preferred embodiment of my invention, I prefer to use three to eight fingers 22, and in the most preferred embodiment of my invention, I prefer to use three to six such fingers. Since the conventional sealed beam headlight is produced by bonding or fusing transparent shield 12 to sidewalls 10, said ring 18 may be fixedly attached to the interior of such headlight by providing fingers 22 that extend from outer edge 24 of ring 18 past interior reflecting surface 26, hereinafter described, of sidewalls 10, so that said fingers rest securely on outer edge 27 of said sidewalls 10. Thereafter, shield 12 is bonded or fused to said outer edge 27 by a conventional technique well known in the art wherein said fingers 22 are securely embedded between outer edge 27 of sidewalls 10 and shield 12.

Figure 4:
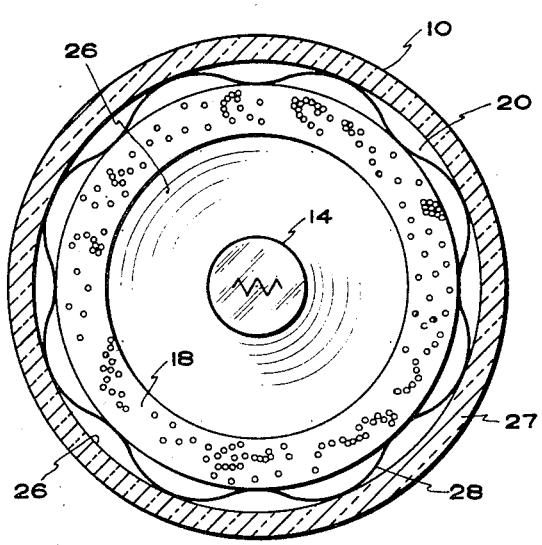
FIGURE 4 is an enlarged plan view of a reflective ring with one type of attaching means secured thereto for maintaining said reflecting ring at a position spaced apart from the sidewalls of a conventional headlight.

FIGURE 4 shows an enlarged view of safety reflecting ring 18 with another type of attaching means secured thereto for positioning said ring 18 within sidewall 10. The attaching means shown in the figure generally comprises wire 28 which is secured to the periphery of said ring 18 at points spaced apart from each other. The wire between the attaching points is bent outwardly away from the periphery of ring 18 and is sized to coact with sidewalls 10. Spacing means of the type described are used to position ring 18 on sidewalls 10 proximate outer edge 27 of said sidewalls 10 and when transparent shield 12 is bonded or fused to said sidewalls said ring 18 cannot move inwardly towards source 14 because of the angularity of sidewalls 10 and, in addition, cannot move outwardly because of shield 12. While wire 28 is not actually bonded between said sidewalls 10 and said shield 12, it is sized to form a tight friction contact between the interior of sidewalls 10 where they join transparent shield 12.

Interior surface 26 of sidewalls 10 is coated or finished with a mirrored surface for directing light from source 14 in a beam outwardly away from said source 14 through transparent shield 12. By spacing ring 18 away from reflecting surface 26, i.e., by providing annulus 20, substantially all of the light emitted by source 14 is beamed outwardly away from said source 14 as previously indicated. This result is further insured by polishing or providing a mirrored finish on back surface 30 of ring 18 which faces light source 14. Accordingly, any light directed on said surface 30 from source 14 is redirected back to interior reflecting surface 26 and then outwardly through the hollow center of ring 18 or through annulus 20 between ring 18 and interior surface 26.

Ring 18 is secured to the interior of my headlight to provide a reflective or luminescent surface 32 which is substantially in the shape of said headlight and which is lighted when a beam of light of greater intensity than the ambient light is directed upon it. Accordingly, when light source 14 is not operating, light directed on said ring 18 will cause said ring to become illuminated and thus inform any person in front of said headlight that it is not operating. To accomplish this purpose, said surface 32 of ring 18 is coated with a conventional luminescent material, well known in the art, which is illuminated when a light is shown upon it. Preferably, said material is a beaded luminescent reflective paint such as is conventionally used for roadside signs. One such beaded reflective paint that is commercially available is sold by the 3M Company under the trademark "Scotch Lite," to which no claim is made, per se, in this application. When light source 14 is operating reflective surface 32 cannot be seen because of the high intensity of light emitted from said source 14 behind said ring 18. However, as indicated, when said source 14 is not functioning, surface 32 of ring 18 can be seen from great distances when the beam of an oncoming light is directed upon it. By using a beaded reflective paint of the type described said surface can be seen even when said beam of oncoming light is directed to said surface 32 at a very substantial angle. It is also within the scope of my invention to use colored luminescent materials when it is desirable for surface 32 to have a colored appearance.

Whereas there is here illustrated and specifically described a certain preferred construction of apparatus which is presently regarded as the best mode of carrying out the invention, it should be understood that certain changes may be made and outer construction adopted without departing from the inventive subject matter particularly pointed out and claimed.

I claim:
1. A headlight having conically shaped sidewalls, light source means secured to said sidewalls proximate their apex for producing light; a reflective surface, positioned in the opening between said sidewalls having a front face which is positioned away from said light source, a back face which is positioned towards said light source, and an open central portion; attaching means secured to the periphery of said reflective surface and imbedded in said sidewalls for fixedly positioning the reflective surface between the conically shaped sidewalls with an annulus between the periphery of the reflective surface and said sidewalls; and luminescent means connected to said front face of said reflective surface for illuminating said front face of said reflective surface when light is directed upon said luminescent means.

2. The headlight of claim 1 wherein said open central portion of said reflective surface is axially aligned with said light source means.

3. The headlight of claim 2 wherein said reflective surface is substantially cylindrically shaped.

4. The headlight of claim 2 wherein a transparent shield is attached to said conically shaped sidewalls proximate the periphery of said sidewalls.

5. The headlight of claim 4 wherein said luminescent means is beaded luminescent reflective paint.

6. The headlight of claim 5 wherein said headlight is a sealed beam headlight.

7. The headlight of claim 4 wherein said attaching means are imbedded in said conically shaped sidewalls proximate the periphery of said sidewalls.

8. The headlight of claim 5 wherein the back side of said surface means is provided with a mirrored finish to redirect light from said back side to said sidewalls.

References Cited

UNITED STATES PATENTS 1,847,134  3/1932  Nikonow _____ 313—111 X
2,744,209  5/1956  Ferguson _____ 313—111

DAVID J. GALVIN, *Primary Examiner.*